(12) United States Patent
Tilkin et al.

(10) Patent No.: US 10,937,290 B2
(45) Date of Patent: Mar. 2, 2021

(54) PROTECTION OF PRIVACY IN VIDEO MONITORING SYSTEMS

(71) Applicants: Jörg Tilkin, Harelbeke (BE); Yves Neuhaus, Kuesnacht (CH); Matthew John Naylor, Myrtle Bank (AU)

(72) Inventors: Jörg Tilkin, Harelbeke (BE); Yves Neuhaus, Kuesnacht (CH); Matthew John Naylor, Myrtle Bank (AU)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 15/776,656

(22) PCT Filed: Nov. 18, 2016

(86) PCT No.: PCT/AU2016/051122
§ 371 (c)(1),
(2) Date: May 16, 2018

(87) PCT Pub. No.: WO2017/083932
PCT Pub. Date: May 26, 2017

(65) Prior Publication Data
US 2018/0330591 A1    Nov. 15, 2018

Related U.S. Application Data

(60) Provisional application No. 62/257,160, filed on Nov. 18, 2015.

(30) Foreign Application Priority Data

Nov. 18, 2015 (AU) .............................. 2015904755

(51) Int. Cl.
*G08B 13/196* (2006.01)
*H04N 7/18* (2006.01)
(Continued)

(52) U.S. Cl.
CPC ... *G08B 13/19686* (2013.01); *G06K 9/00718* (2013.01); *G06T 15/02* (2013.01);
(Continued)

(58) Field of Classification Search
CPC ................................................ G06B 13/19686
See application file for complete search history.

(56) References Cited

U.S. PATENT DOCUMENTS 9,058,523 B2   6/2015   Merkel et al.
9,237,315 B2   1/2016   Naylor et al.
(Continued)

FOREIGN PATENT DOCUMENTS

CN   101517431 A   2/2009
CN   101610396 A   12/2009
(Continued)

OTHER PUBLICATIONS

"International Application No. PCT/AU2016/051122, International Search Report and Written Opinion dated Jan. 24, 2017", (Jan. 24, 2017), 12 pgs.
(Continued)

*Primary Examiner* — Girumsew Wendmagegn
(74) *Attorney, Agent, or Firm* — Brooks, Cameron & Huebsch, PLLC (57) ABSTRACT

The invention relates to a method of processing a video, including: receiving a video of a scene being monitored; generating a second video, including one or more video frames, which non-photorealistically represents the scene being monitored; analysing at least the video of the scene being monitored to determine the presence of a threat within the scene; and in the event that a threat is detected within the scene, determining metadata in relation to the threat and representing said metadata in the second video.

19 Claims, 5 Drawing Sheets

(51) Int. Cl.
*G06K 9/00* (2006.01)
*G06T 15/02* (2011.01)
*G11B 27/029* (2006.01)
*G11B 27/34* (2006.01)

(52) U.S. Cl.
CPC . *G08B 13/19604* (2013.01); *G08B 13/19608* (2013.01); *G08B 13/19641* (2013.01); *G08B 13/19645* (2013.01); *G08B 13/19671* (2013.01); *G08B 13/19673* (2013.01); *G08B 13/19693* (2013.01); *G11B 27/029* (2013.01); *G11B 27/34* (2013.01); *H04N 7/18* (2013.01); *G06K 2009/00738* (2013.01)

(56) References Cited

U.S. PATENT DOCUMENTS

| | | | |
|---|---|---|---|
| 2008/0074494 A1 | 3/2008 | Nemethy et al. | |
| 2008/0117295 A1* | 5/2008 | Ebrahimi | G08B 13/19604 348/143 |
| 2008/0198159 A1 | 8/2008 | Liu et al. | |
| 2009/0046147 A1* | 2/2009 | Henson | G08B 13/19604 348/143 |
| 2013/0012315 A1 | 1/2013 | Reinpoldt et al. | |
| 2016/0253579 A1* | 9/2016 | Bamba | G06K 9/2081 382/103 |

FOREIGN PATENT DOCUMENTS

| | | |
|---|---|---|
| CN | 101610408 A | 12/2009 |
| CN | 101933027 A | 12/2010 |
| DE | 102007029606 B3 | 1/2009 |
| EP | 1388802 A2 | 2/2004 |
| WO | WO-2017083932 | 5/2017 |

OTHER PUBLICATIONS

Cavallaro, Andrea, et al., "Adding Privacy Constraints to Video-Based Applications", Proceedings of the European Workshop for the Integration of Knowledge, Semantics and Digital Media Technology (EWIMT), Nov. 25-26, 2004, (Nov. 25, 2004), 8 pgs.

Senior, Andrew, et al., "Enabling Video Privacy Through Computer Vision", IEEE Security & Privacy, vol. 3, No. 3, May 2005, (May 2005), 50-57.

Senst, Tobias, et al., "A decentralized privacy-sensitive video surveillance framework", 2013 18th International Conference on Digital Signal Processing (DSP), Jul. 1-3, 2013, Fira, Greece, (Oct. 10, 2013), 6 pgs.

Thuraisingham, Bhavani, et al., "Access control, confidentiality and privacy for video surveillance databases", Proceedings of ACM Symposium on Access Control Models and Technologies, SACMAT. 2006. 1-10., (Jun. 7, 2006), 10 pgs.

Extended Search Report from related European Application No. 16865316, dated Jun. 4, 2019, 9 pages.

Office Action from related China Patent Application No. 20160067548.5, dated Nov. 28, 2019, 13 pages.

* cited by examiner

PROTECTION OF PRIVACY IN VIDEO MONITORING SYSTEMS

PRIORITY CLAIM TO RELATED APPLICATIONS

This application is a U.S. national stage application filed under 35 U.S.C. § 371 from International Application Serial No. PCT/AU2016/051122, which was filed 18 Nov. 2016, and published as WO2017/083932 on 26 May 2017, and which claims priority to Australian Application No. 2015904755, filed 18 Nov. 2015, and to U.S. Provisional Application Ser. No. 62/257,160, filed 18 Nov. 2015, which applications and publication are incorporated by reference as if reproduced herein and made a part hereof in their entirety, and the benefit of priority of each of which is claimed herein.

FIELD OF THE INVENTION

The present invention generally relates to video monitoring systems for security systems that employ video capture. More specifically, the invention relates to the protection of privacy in such systems.

BACKGROUND OF THE INVENTION

Video monitoring systems allow human operators to remotely observe activity through video cameras at monitored sites. The widespread adoption of video monitoring systems as a means of centralising security has resulted in many security cameras being installed around the world. This in turn has raised privacy concerns by many and in some countries has resulted in legislation controlling the viewing of video from security cameras. In particular, there is concern that the identity of vehicles, individuals and their activities should be hidden from operators so that private lives are not compromised.

In an effort to restrict what operators can see, many privacy protection methods have been implemented in the industry. Several examples of these are listed below.

Privacy masks are blanked out regions that an installer can place over areas of an image that an operator should not see. For example, private residences can be protected from street cameras by masking out the residences in the street camera video. Corridors may be monitored without an operator being able to see into adjacent offices if the offices are masked out in the same way. These privacy masks can be implemented in the cameras or recording systems so that the recorded video never contains the hidden information. Alternatively the viewing software can implement these masks. This latter approach allows operators with different levels of authority to view more of the video scene, and allows for forensic analysis of the whole video scene in recorded footage by persons with sufficient privilege, such as in cases involving serious crime.

Blurring is another approach to privacy. The street view in Google Maps uses this technique in its static imagery to hide faces and vehicle registration plates, but it is also used in television news reports to hide the faces of victims during interviews. Again these methods can be implemented where the video is captured or stored, or where it is viewed.

Another approach is to pixelate the area to be hidden. Pixelation typically involves averaging blocks of pixels in the image and displaying the average in place of each of the pixels in the block. The result is a very low resolution image of the face or registration plate, comprising perhaps one dozen pixels, making it impossible to recognise.

A common challenge of the blurring and pixilation methods is that the protected area must follow the movement of the target in order to protect their identity. If the target moves quicker than the privacy method can respond, then the target's identity may be revealed.

In security applications, the privacy method must not compromise the security of the monitored premises. In the case of masked areas, the areas not masked may be monitored without compromise. However, if blurring or pixilation is used, then the degree of these effects may limit the effectiveness of the operator.

SUMMARY OF THE INVENTION

The present invention provides an alternative means of implementing privacy measures whereby an operator can make informed decisions with a controlled amount of relevant information.

In a first aspect the present invention provides a method including:
  receiving a video of a scene being monitored;
  generating a second video, including one or more video frames, which non-photorealistically represents the scene being monitored;
  analysing at least the video of the scene being monitored to determine the presence of a threat within the scene,
  in the event that a threat is detected within the scene, determining metadata in relation to the threat and representing said metadata in the second video.

Representing said metadata in the second video can include indicating in the second video, any one or more of:
  a location of the threat within the representation of the scene;
  motion of the threat;
  showing some or all of the metadata in textual or pictorial form.

Showing the location of the threat within the representation of the scene can include, drawing a shape e.g. a bounding box around a non-photorealistic representation of the threat within the scene, placing an indicia, icon, picture or other marker at a location of the threat in the representation of the scene.

The motion of the threat can be represented by showing an updated location of the threat in successive video frames; by indicating either or both of a track along which the threat has passed; and a vector indicating the current motion of the threat.

An animation can represent both the location and motion of the threat within the scene.

The threat can be represented in the second video by an avatar. The avatar can have visual characteristics that express metadata associated with the threat, e.g. size, location, colour, motion etc.

The non-photorealistic representation of the scene can be generated from the received video, generated from an earlier image of the scene, or in some other manner. Generating the non-photorealistic representation of the scene from the received video can include processing the received video to adulterate or obscure the realism of the video, e.g. by blurring or pixellating the received video.

Analysing at least the video of the scene being monitored to determine the presence of a threat within the scene, can include performing video motion detection on the video to detect an intruder.

Determining metadata in relation to an intruder can include determining a physical characteristic of an intruder, e.g. height, hair colour, clothing colour, weight.

Analysing at least the video of the scene being monitored to determine the presence of a threat within the scene or determining metadata associated with the threat can include analysing data from at least a second source, e.g. a second camera, a PIR detector, microwave detector, ultrasonic detector, perimeter intrusion detector, pressure pad.

The method can include one or more of:

Capturing the video;

Transmitting the second video for playback;

Storing either or both of the video and the second video; and

Playing the second video on a display.

The method can further include receiving an input authorising transmission of the video of the scene. In this case the method may include transmitting the video of the scene. Preferably the video of the scene is augmented to show metadata relating to the threat.

In a second aspect, the invention provides a method of representing a threat on a display of a video surveillance system of the type which captures a video of a scene being monitored by a camera, the method including:

generating a second video, including one or more video frames, which non-photorealistically represents the scene, and in the event that a threat is detected within the scene, representing metadata relating to the threat in the second video.

The method can include selectively representing metadata depending on a permission level associated with a viewer of the display.

The method can include receiving data representing the permission level of the viewer and representing a predetermined subset of the metadata in accordance with the permission level. Representing said metadata in the second video can include indicating in the second video, any one or more of:

a location of the threat within the representation of the scene;

motion of the threat;

showing some or all of the metadata in textual or pictorial form.

Showing the location of the threat within the representation of the scene can include, drawing a shape around a non-photorealistic representation of the threat within the scene, placing an indicia, icon, picture or other marker at a location of the threat in the representation of the scene.

The motion of the threat can be represented by showing an updated location of the threat in successive video frames; by indicating either or both of a track along which the threat has passed; and a vector indicating the current motion of the threat.

An animation can represent both the location and motion of the threat within the scene. For example, the threat can be represented in the second video by an avatar. The avatar can have visual characteristics that express metadata associated with the threat, e.g. size, location, colour, motion etc.

The non-photorealistic representation of the scene can be generated from the received video, generated from an earlier image of the scene, or in some other manner. Generating the non-photorealistic representation of the scene from the received video can include processing the received video to adulterate or obscure the realism of the video, e.g. by performing one or a combination of the following image processing steps: blurring, pixelating, modifying one or more attributes of each of the one or more video frames, e.g. resolution, gradient, brightness, contrast, saturation, sharpness, hue or similar thereof, masking, image distortion, merging frames, temporal or spatial averaging, compressing, replacing at least a portion or an entire video frame with another predetermined or a randomly generated image, and so on. The aim being to generate a 'non-photorealistic' image in which there is less correlation between the scene being monitored and the second video generated (in comparison to the amount of correlation between an original video received and the real scene) in order to prevent at least some details of the scene being visually identifiable by a person looking at the second video. The details may include characteristics of one or more objects contained in the video, for example, an animal, a person, a building structure, a vehicle, or similar thereof.

It is preferable however, that some characteristics of the scene be preserved in the non-photorealistic images. Such preserved features can include, but are not limited to: the presence or location of large objects, structures and topological features in the scene or other similar visual cues to provide spatial context to the viewer; localised or overall illumination level in the scene, time or day, weather conditions. The presence of such features can aid a user of the system to interpret the characteristics of a threat detected by the system, and make an appropriate response to it, such as raiding an alarm, escalating a threat level, performing or instigating further automatic or human-based investigation or analysis or the like.

In some embodiments of the aspects disclosed herein the non-photorealistic representation of the scene can include adulterating or obscuring the realism of either the whole or part of one or more image frames.

In a further aspect the present invention also provides a system for performing one or more embodiments of any one of these methods.

Reference to a "threat" herein includes reference to a potential or suspected threat, not only actual threats.

Reference to any prior art in the specification is not an acknowledge or suggestion that this prior art forms part of the common general knowledge in any jurisdiction or that this prior art could reasonably be expected to be understood, regarded as relevant, and/or combined with other pieces of prior art by a skilled person in the art.

As used here, except where the context suggest otherwise, the term 'comprise' and variations of the term, such as 'comprising', 'comprises' and 'comprised', are not intended to exclude further additives, components, integers or steps.

BRIEF DESCRIPTION OF THE DRAWINGS

Further aspects of the present invention and further embodiments of the aspects described in the preceding paragraphs will become apparent from the following description, given by way of example and with reference to the accompanying drawings in which.

DETAILED DESCRIPTION OF THE EMBODIMENTS

The present embodiments are directed to a method of and system for implementing privacy measures in a video monitoring system whereby an operator can make informed decisions with a controlled amount of relevant information.

Figure 6:
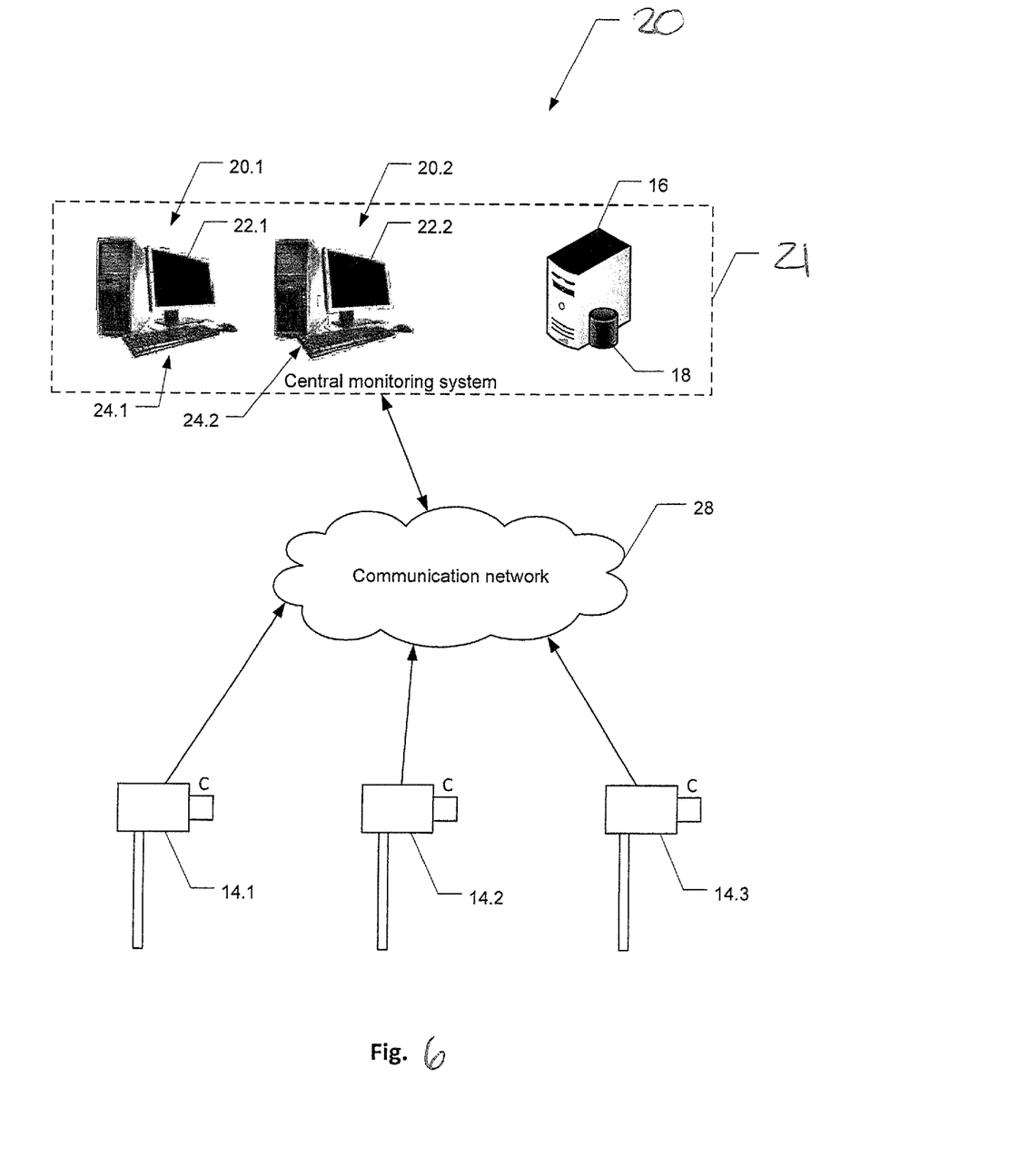
FIG. 6 shows a schematic diagram of a video monitoring system formed by a central monitoring system and a number of sensing devices, in accordance with an example embodiment.

FIG. 6 shows a schematic diagram of an exemplary video monitoring system which may implement an example embodiment of the present methods. The monitoring system 20 includes, amongst its sensing devices 14.1, 14.2 and 14.3 at least one image capture system, e.g. a camera that is capable of capturing and outputting a video, either as a video stream or one or more images. As will be understood each surveillance camera is commissioned to capture images of a scene within its field of view that encompasses an area being monitored. In the customary manner the videos being captured are viewed by users of the system to determine if a threat exists and allow them to take appropriate action in response to the threat.

In accordance with a first embodiment, the entire image captured by a camera of the monitoring system is privacy protected by means of pixilation and/or blurring prior to its display to a user. Thus instead of displaying a photorealistic image of the scene to a user a non-photorealistic image, which protects the privacy of occupants/items within the scene, is presented. This has the advantage that the whole scene is protected in terms of the privacy of occupants/items within the scene, and it is not possible for the identity of a moving target to be accidentally revealed by poor alignment with privacy masking or other spatially constrained privacy measures.

Any given camera in a security system will have particular image capture characteristics, for example:

It will capture images a certain distance to subjects/objects whose privacy is to be protected;

It will have an optical system with a certain magnification;

It will have an image capture system with a given image capture resolution.

Accordingly in some embodiments, it may be necessary to specify the extent to which its images are processed to make them non-photorealistic. For example, a camera that is placed to closely monitor a hallway may have people pass through its field of view within 2 meters of the camera, whereas a camera set to monitor the perimeter of a building from a post set back from the perimeter, may not have a person within 20 meters of the camera. In the first case the extent of alteration to a captured image to make it sufficiently non-photorealistic may be much larger than the second case. In the case where the frames of the second video, are made non-photorealistic by pixelisation, the first camera in the example above will need a high degree of pixelisation to obscure the high level of detail that it can capture about people within the hallway. On the other hand because the second camera will capture less detail of people, its images will require less pixelisation. The effect of processing of the received video to adulterate or obscure the realism of the video by blurring or pixellating the received video can be set on a per camera basis, or on a per system basis, or factory set. Moreover the level of processing could be user definable at commissioning or thereafter.

The monitoring system uses video analytics performed on the video captured (possibly with the assistance of the output from other types of sensors) by the camera to detect the arrival of a threat, in this case an intruder. In some forms detection of the threat can be performed as described in U.S. patent application Ser. No. 14/636,334, the contents of which are incorporated herein by reference. The monitoring system then computes metadata from the captured video and/or the output from one or more other sensors and presents this metadata to the user along with the non-photorealistic video image of the scene. In this embodiment it is achieved by drawing on the pixelated image a rectangle that bounds the detected intruder in the scene. It will be clear to the reader that although the image contains little information about the nature of the activity, or the identity of the intruder, the presence of the bounding box informs the operator that a security event has occurred (i.e. the threat is present). The location and path of the bounding box highlights the location and path of the intruder. The dual purposes of protecting the privacy of all occupants in the scene, while simultaneously and usefully representing the existence of the threat and the path of a threat to a security operator are thus realised. In other embodiments the image may be made to be non-photorealistic in a wide variety of ways, e.g. by blurring the entire video image or by uniformly blanking out the entire video scene, by providing a stylised representation of some or all visual features of the scene, by providing a grid representing spatial coordinates in the scene etc. Other methods of providing a non-photorealistic image representing the scene can also be provided.

In embodiments operating in accordance with U.S. Ser. No. 14/636,334, the method can include displaying an image detection area identified on a video image received from a sensing device. A bounding box can define the edges of the detection area. Any such bounding boxes will be displayed in association with the second video (e.g. superimposed over it), so that the user can determine where the detection areas are each image. Moreover the alarm state of each image detection region could be displayed, e.g. by showing the bounding box in a colour corresponding to an alarm status.

The metadata may be acquired and/or computed by one or more detectors, and presented to the operator in the form of a list of features. Suitable detectors include, but are not limited to, video analytics, PIR, radar, pressure mats and vibration detectors. Metadata may comprise, but is not limited to target weight, estimated age, gender, hair colour, clothing colour, race, gait, facial features, size, speed, and direction of travel. The metadata may be presented to the operator by writing on the display inside, or adjacent to, the bounding box enclosing the detected target a list of all the detected features.

The metadata may instead be represented as an animation e.g. of an avatar, icon or the like, drawn over the top of the non-photorealistic privacy image, again in the location of the target being tracked. By way of example, the animation could be a stick figure representing all features of the metadata, or a fully clothed and animated cartoon character. These representations readily convey key elements of the intruder without divulging their identity.

As noted above an aspect of the invention relates to how a threat is displayed in a user interface of a video surveillance system. In preferred forms this involves non-photorealistically representing the scene; and in the event that a threat is detected within the scene, representing metadata relating to the threat in the non-photorealistic representation of the scene.

Importantly in some embodiments, the method can include selectively representing metadata depending on a permission level associated with a viewer of the display. For example, the metadata may be filtered based on the security level of the operator. A junior operator may only see basic information, or a simple stick figure in an otherwise non-photorealistic scene. A senior operator may see most of the metadata information, or a fully clothed and appropriately padded and coloured animation of a person. Thus the metadata information itself may be privacy filtered depending on the permission level of the viewer of the video. In some cases, where permissions allow e.g. after detection of a significant threat, and appropriate approvals, the raw video may be transmitted or displayed. The transmission or display of the raw video may form part of a forensic analysis of the threat, or in some cases permitted in real-time as the threat is present.

In some embodiments the method may include enabling the transmission or display of the raw video in either an armed or disarmed state, and a second video including non-photorealistic images in the other state. For example, a system where the identity of people needs to be additionally monitored during the "armed state", but not in the "disarmed state", may only generate the second video during the disarmed state. Whereas, systems that need to protect the identity of people/objects in the armed state, but needs extra detail when in the disarmed state, e.g. for commissioning, etc, may only generate the second video during the armed state.

System

FIG. 6 shows a schematic diagram of a monitoring system according to an exemplary embodiment of the invention. The monitoring system 20 comprises a central monitoring station 21 which is in communication with one or more sensing devices that monitor a number of areas for various threat events. At least some of the sensing devices are surveillance cameras, indicated by reference numerals 14.1, 14.2 and 14.3 that may be of the type that provides video content, either as video streams or one or more images, to the central monitoring station 21. Thus, the surveillance cameras 14.1, 14.2 and 14.3 may be video cameras. Each of these surveillance cameras is commissioned to have a field of view, typically in an area close to an area with restricted access. The surveillance cameras communicate with the central monitoring system over a suitable network 28. For example the system can include one or more video security products, data storage, access control, video distribution, perimeter detection, and management hardware and software systems as sold under the product line of ADPRO by Xtralis.

The central monitoring station 21 typically comprises a server 16 and data storage 18 in the form of one or more databases that store information on sensing devices and the video monitoring system. The central monitoring station 21 also has one or more operator stations (two operator stations indicated by reference numerals 20.1 and 20.2) that are connected to the server 16 and databases 18 thereby to enable the operators to access relevant data. Each operator station includes one or more user interfaces 22.1, 22.2 to display and receive information into the central monitoring system 21. In one example embodiment, the user interface 22.1, 22.2 may be a display screen 24.1, 24.2 with a keyboard 26.1, 26.2 and mouse (not shown). The user interface may also be a touch screen, in some example embodiments.

The central monitoring station 21, either the server 16 or the operator stations, has one or more processing units and memory, for storing instructions for execution by the processing units. The stored instructions enable the central monitoring station 21 to perform various functions and to process received data, as will be described in more detail below. Although functionality is described with relation to the central monitoring station 21, it will be appreciated that all functions need not be performed by the central monitoring station 21 and that some of the processes could be executed on other devices. For example, some of the operations and functionality relating to conditions, threat detection, video analytics, metadata capture and creation and alarms may be computed on intelligent surveillance cameras, in an intelligent hub, in a cloud service remote from the central monitoring station 21 or the like.

In a one embodiment, the server receives raw camera data from surveillance cameras 14.1-14.3 over communication network 28 and stores the data in data storage 18. The raw camera data is analysed and processed to generate a second video or a series of images which non-photorealistically represent the scene and threat. The second video is then displayed to one or more operators at the operator stations 20.1, 20.2.

According to a preferred embodiment of the invention, the system comprises video analytics that analyses images captured by the cameras 14.1-14.3, determines the presence of a threat with the scene, and computes metadata representing the threat. The server 16 then preferably generates a second video including one or more video frames, which non-photorealistically represents the scene and the threat, and displays the second video including one or more video frames to the operators at the operator stations. It should be appreciated by a reader that the video analytics may reside within the cameras 14.1-14.3, or on the server 16, or at the operator stations 20.1, 20.2.

The operator stations, the cameras and the server may not always be in data communication.

In one embodiment, the server receives raw camera data when the system is in use and stores it in data storage 18. The video analytics is provided as computer executable instructions that is stored on the server which analyses the raw camera data received. If a potential threat has been detected, the server may then initiate data communication with the operator stations by transmitting and displaying the second video including one or more video frames which non-photorealistically represents the scene and the threat on displays 22.1 and/or 22.2.

In another embodiment, the server may be in continuous data communication with the operator stations when the cameras are in use. A second video, which non-photorealistically represents the scene, may be displayed to the operators at operator stations at all times. Again the video analytics may reside within the server or within one or more operator stations.

In some embodiments the creation and optionally storage of the original video captured by a camera may be performed remotely from the server 16, e.g. in a processor and data storage system associated with an intelligent camera or hub. In this case only data representing the second video and metadata need be transmitted to the server 16. Such an arrangement has the added advantage that if a pixelated, highly compressed, or otherwise simplified representation of the scene is used in the second video, the level of data that needs to be transferred to the server is reduced compared to sending full resolution video.

As will be appreciated by those skilled in the art, in some security systems, a video feed from a camera monitoring a scene will not be continuously sent to the operator station, and possibly not to the server. Instead, the transmission of such video may be triggered by the detection of a possible threat by a sensor (or combination of sensors), e.g. video analytics, PIR detector (or other sensor), and the present invention can be implemented in such a manner. Moreover, in some security systems a user of an operator station may not receive full motion video in the event that a threat is detected, instead a single frame or series of single frames spaced apart by some time interval may be presented. The second video generated by embodiments of the present invention thus may be full-motion video e.g. presented at the same frame rate as the original video was captured, or a reduced frame rate, but may also be just a single frame, or series of several frames representing the scene at a discrete points in time. The metadata presented along with the frames in the second video, may represent metadata of the threat at the time of capture of the frame (e.g. instantaneous velocity detected by a radar, colour etc), or cumulative metadata that covers a time period longer than a frame, e.g. a track of the motion of the threat either since its first detection, over a fixed time interval, or since the point in time corresponding to the previous frame of the second video.

Figure 7:
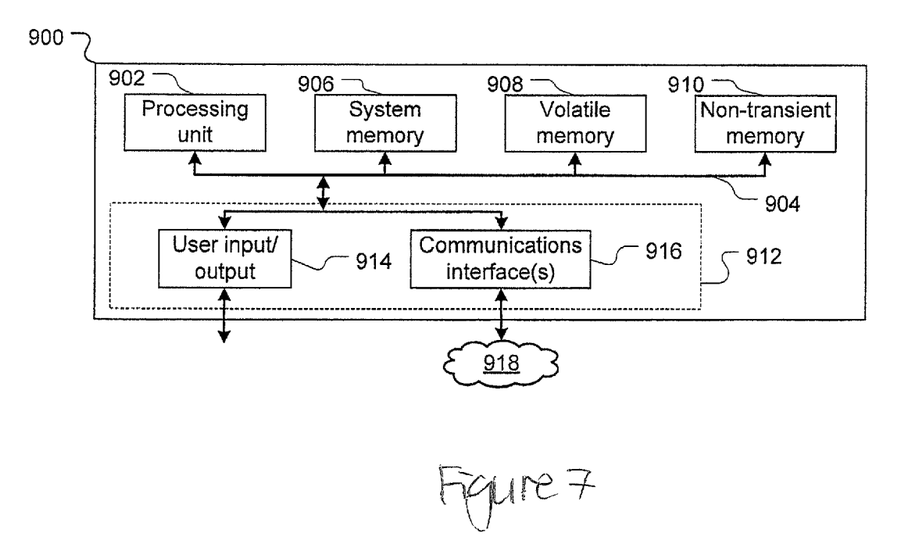
FIG. 7 is a block diagram illustrating a computer processing system for use as a central monitoring station 21, in accordance with an example embodiment.

FIG. 7 is a block diagram illustrating a typical computer processing system 900 suitable for use/configuration as the central monitoring system 21 as described above. For example, the typical computer system may be suitable for both the server 16 of the central monitoring system 21 as well as the operator stations 22.1, 22.2.

Computer processing system 900 comprises a processing unit 902. The processing unit 902 may comprise a single computer-processing device (e.g. a central processing unit, graphics processing unit, or other computational device), or may comprise a plurality of computer processing devices. In some instances processing is performed solely by processing unit 902, however in other instances processing may also, or alternatively, be performed by remote processing devices accessible and usable (either in a shared or dedicated manner) by the computer processing system 900.

Through a communications bus 904 the processing unit 902 is in data communication with one or more machine-readable storage (memory) devices that store instructions and/or data for controlling operation of the computer processing system 900. In this instance computer processing system 900 comprises a system memory 906 (e.g. a BIOS or flash memory), volatile memory 908 (e.g. random access memory such as one or more DRAM modules), and non-volatile/non-transient memory 910 (e.g. one or more hard disk or solid state drives).

Computer processing system 900 also comprises one or more interfaces, indicated generally by 912, via which the computer processing system 900 interfaces with various components, other devices and/or networks. Other components/devices may be physically integrated with the computer processing system 900, or may be physically separate. Where such devices are physically separate connection with the computer processing system 400 may be via wired or wireless hardware and communication protocols, and may be direct or indirect (e.g., networked) connections.

Wired connection with other devices/networks may be by any standard or proprietary hardware and connectivity protocols. For example, the computer processing system 900 may be configured for wired connection with other devices/communications networks by one or more of: USB; FireWire; eSATA; Thunderbolt; Ethernet; Parallel; Serial; HDMI; DVI; VGA; AudioPort. Other wired connections are possible.

Wireless connection with other devices/networks may similarly be by any standard or proprietary hardware and communications protocols. For example, the computer processing system 400 may be configured for wireless connection with other devices/communications networks using one or more of: infrared; Bluetooth (including early versions of Bluetooth, Bluetooth 4.0/4.1/4.2 (also known as Bluetooth low energy) and future Bluetooth versions); Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, the devices to which computer processing system 900 connects—whether by wired or wireless means—allow data to be input into/received by computer processing system 900 for processing by the processing unit 902, and data to be output by computer processing system 900. Example devices are described below, however it will be appreciated that not all computer processing systems will comprise all mentioned devices, and that additional and alternative devices to those mentioned may well be used.

For example, computer processing system 900 may comprise or connect to one or more input devices by which information/data is input into (received by) the computer processing system 900. Such input devices may comprise physical buttons, alphanumeric input devices (e.g., keyboards), pointing devices (e.g., mice, track-pads and the like), touchscreens, touchscreen displays, microphones, accelerometers, proximity sensors, GPS devices and the like. Computer processing system 900 may also comprise or connect to one or more output devices controlled by computer processing system 900 to output information. Such output devices may comprise devices such as indicators (e.g., LED, LCD or other lights), displays (e.g., LCD displays, LED displays, plasma displays, touch screen displays), audio output devices such as speakers, vibration modules, and other output devices. Computer processing system 400 may also comprise or connect to devices capable of being both input and output devices, for example memory devices (hard drives, solid state drives, disk drives, compact flash cards, SD cards and the like) which computer processing system 400 can read data from and/or write data to, and touch-screen displays which can both display (output) data and receive touch signals (input).

Computer processing system 900 may also connect to communications networks (e.g. the Internet, a local area network, a wide area network, a personal hotspot etc.) to communicate data to and receive data from networked devices, which may be other computer processing systems.

The architecture depicted in FIG. 7 may be implemented in a variety of computer processing systems, for example a laptop computer, a netbook computer, a tablet computer, a smart phone, a desktop computer, a server computer. It will also be appreciated that FIG. 10 does not illustrate all functional or physical components of a computer processing system. For example, no power supply or power supply interface has been depicted, however computer processing system 900 will carry a power supply (e.g. a battery) and/or be connectable to a power supply. It will further be appreciated that the particular type of computer processing system will determine the appropriate hardware and architecture, and alternative computer processing systems may have additional, alternative, or fewer components than those depicted, combine two or more components, and/or have a different configuration or arrangement of components.

Operation of the computer processing system 900 is also caused by one or more computer program modules which configure computer processing system 900 to receive, process, and output data. One such computer program module will be an operating system such as (by way of non-limiting example) Apple iOS or Android.

As used herein, the term "module" to refers to computer program instruction and other logic for providing a specified functionality. A module can be implemented in hardware, firmware, and/or software. A module is typically stored on the storage device 908, loaded into the memory 906, and executed by the processor 902.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

It will be appreciated that the types of computer systems 900 used by the respective entities of FIG. 7 may vary depending upon the embodiment and the processing power used by the entity. For example, the server systems may comprise multiple blade servers working together to provide the functionality described herein.

Worked Example

A working example is now described, to illustrate how a monitoring system may operate.

The system employs at least one sensing device in the form of a video camera which is used to view and monitor a scene (in the form of a field of view). The image taken by the camera is a two-dimensional projection of that three-dimensional scene onto the image plane of the camera. The camera image is then displayed on a computer monitor or display.

Figure 1A:
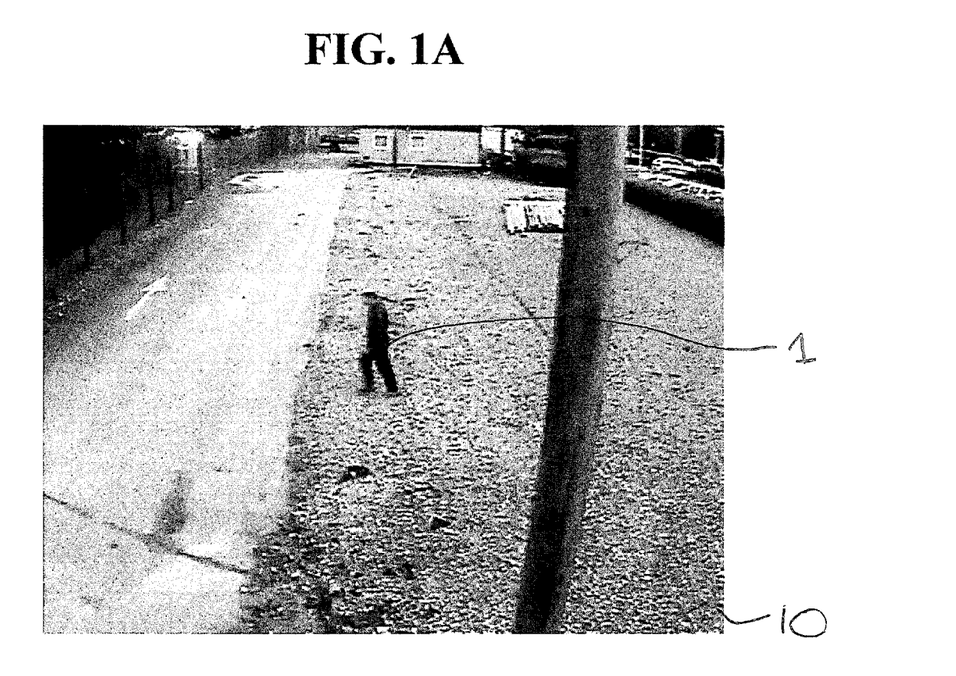
FIG. 1A shows an image from a video of a scene, captured by a camera without any privacy information being hidden.

FIG. 1A shows an image 10 from a video of a scene captured by one of the sensing devices 14.1, 14.2, 14.3 without any prior privacy information processing. The image 10 shows a road, a power pole, and a person 1 at a central region of the monitored space. The image 10 of FIG. 1A could potentially reveal or give away privacy information of the person 1 and/or the scene, as it shows all the details of scene captured by the camera. For example a system operator looking at the image 10 may be able to identify identity of the person 1, or where the camera is located based on the original image 10.

Figure 1B:
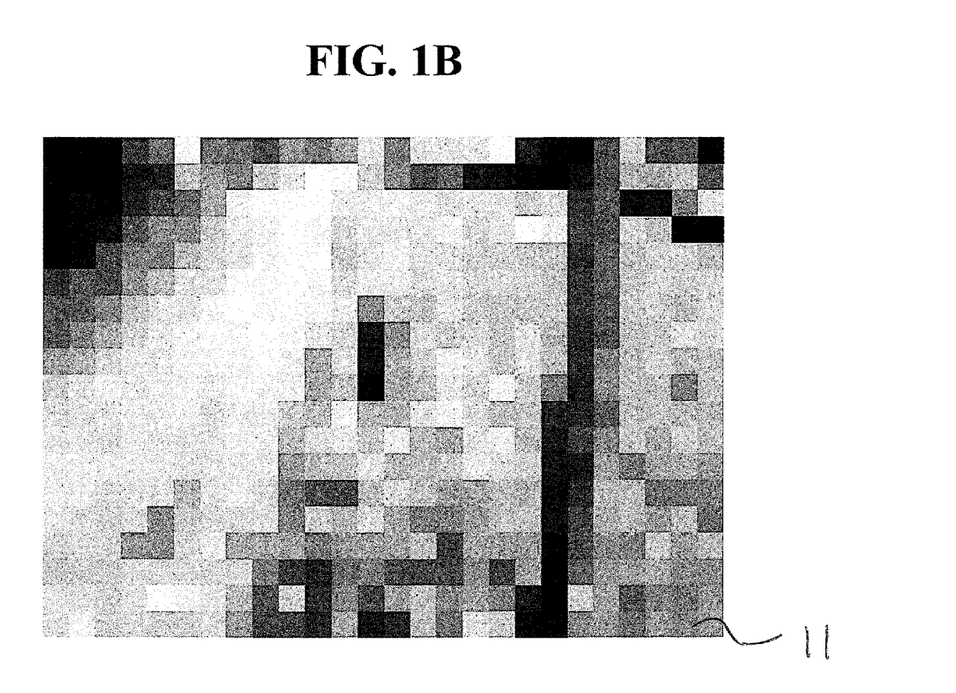
FIG. 1B shows the video frame from the second video in which the image of FIG. 1A has been pixelated to make it non-photorealistic.

FIG. 1B shows a frame of a second video which is the entire image 10 of FIG. 1A but having been processed and displayed as a pixilation image 11. As shown, the entire scene 10 captured by the camera is processed and presented as an array of larger pixels to obscure the information contained in the original image 10. An operator will no longer be able to identify that there is a person 1 in the centre of the image 11, nor would the operator be able to identify any features of the person 1 based on the image 11 from the second video.

One of the advantages of processing the entire image this way is that a moving target will always be privacy protected regardless of the location and/or moving speed. The privacy information will not be accidentally revealed by poor alignment with a privacy mask. It will be clear to the reader that the privacy protection may also be implemented by blurring the entire video image or by uniformly blanking out the entire video scene, or by a combination of the privacy protection techniques mentioned above.

Figure 2:
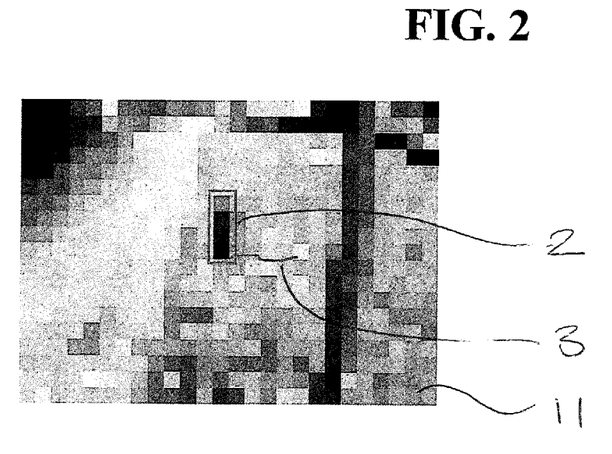
FIG. 2 shows a video frame from the second video in which a threat has been detected and in which the position of the threat is indicated by a bounding box and a movement path of the threat in the image of FIG. 1B.

The system uses video analytics, e.g. such as may be implemented in the ADPRO FastTrace 2E system from Xtralis using software such as IntrusionTrace, also from Xtralis, that detects the arrival of a potential threat, for example an intruder has entered into the camera monitored area, computes metadata relating to the intruder from the unprotected raw camera data of the first video, and presents the metadata on the pixilation image of the second video. In one form, the threat, i.e. the intruder 1, is indicated on the pixelated image 11 by for example a bounding box 2 such as that shown in FIG. 2. The bounding box 2 indicates that there is a potential threat in the camera monitored area and the movement trace 3 of the potential security concern.

Figure 3:
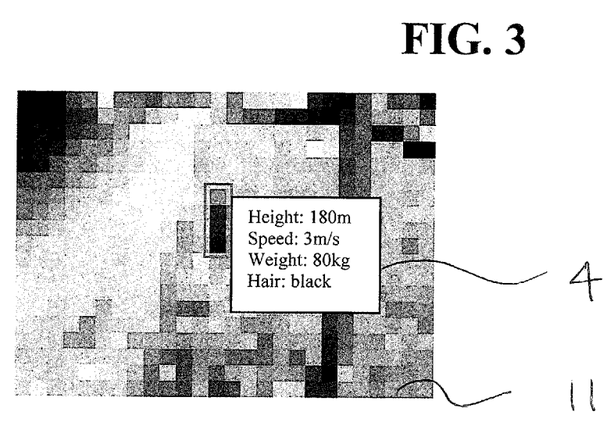
FIG. 3 shows textured metadata displayed next to the indicated threat of FIG. 2.

In the example shown in FIG. 3, the metadata 4 is presented to the operator by overlaying additional textual metadata 4 on top of the privacy protected camera image 11 and adjacent to the bounding box 2 enclosing the detected intruder 1. In an alternative form, the metadata 4 may be rendered on the privacy protected image 11 at a different location and/or being presented in a different format.

Preferably, the metadata being displayed to an operator contains information that will not invade the privacy of the intruder or at least not against the privacy settings of the users of the system. The metadata is acquired and/or computed by one or more detectors, and presented to the remote operator in the form of a list of features overlayed on to the privacy protected image 11 such as that shown in FIG. 3. Suitable detectors may include, but are not limited to, video analytics, passive infrared (PIR), radar, pressure mats and vibration detectors or similar thereof.

Metadata computed by the detectors may comprise, but is not limited to target weight, estimated age, gender, hair colour, clothing colour, race, gait, facial features, size, speed, and direction of travel.

Figure 4:
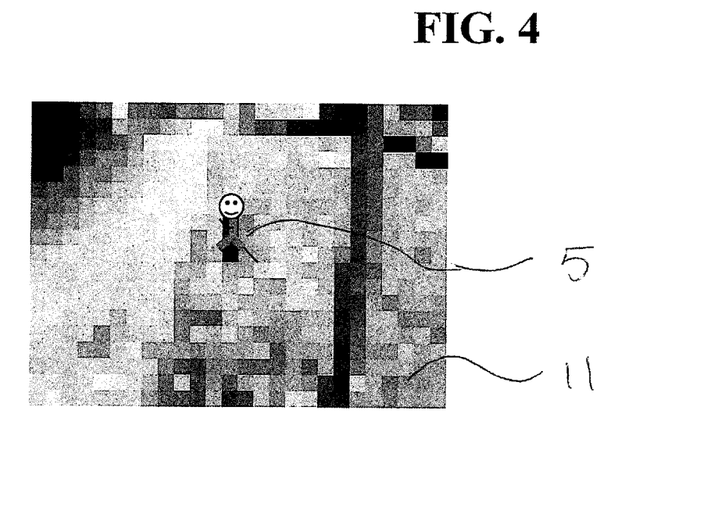
FIG. 4 shows metadata of the threat represented as an animated avatar on a pixelated image of the scene captured.

With reference to FIG. 4, the potential security concern may instead be represented as an animation 5 of an avatar overlayed on the privacy protected image 11, again at the location of the target being tracked. By way of example, the animation could be a stick figure representing all features of the metadata, or a fully clothed and animated cartoon character. These representations readily convey identified information of the intruder 2 without revealing the privacy information of the intruder 2. In FIG. 4, where the metadata is converted to an animated target, the key features of that target (such as the blue outfit) can be represented.

Figure 5:
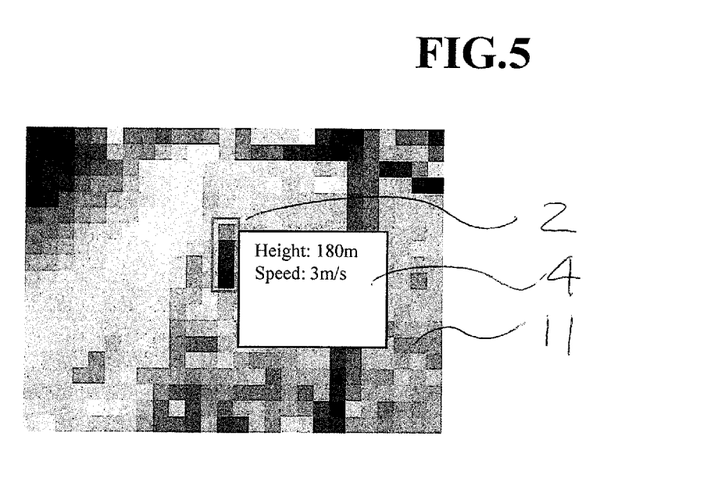
FIG. 5 shows the same image as FIG. 3 but with less textual metadata, based on operator privilege.

Preferably the system allows customising or filtering the metadata 4 based on the security level of the system or user preference. A junior operator may only see basic information, or a simple stick figure in an otherwise blurred scene such as that shown in FIG. 4 or 5. A senior operator may see most of the information, or a fully clothed and appropriately padded and coloured animation of a person such as that shown in FIG. 3. The metadata 4 itself may be customised and privacy filtered depending on system requirements.

It will be clear to the reader that although the privacy protected image 11 contains little visual information about the nature of the activity, the presence of the bounding box 2 informs the system operator that a potential security concern has entered the area monitored by the camera, and the location and trace 3 of the bounding box 2 highlights the location and path of the potential security concern. In this way, the detailed privacy information of the person and the scene are protected. However, other non-privacy protected information included in the computed metadata 4 is displayed in various selected forms on top of the privacy protected image to assist the operator to make an informed decision.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of processing a video, including:
    receiving a video of a scene being monitored;
    generating a second video, including one or more video frames, which non-photorealistically represents the scene being monitored;
    analysing at least the video of the scene being monitored to determine the presence of a threat within the scene; and
    in the event that a threat is detected within the scene, determining metadata in relation to the threat and representing said metadata in the second video, wherein said second video includes a non-photorealistic representation of said threat.

2. The method of claim 1, wherein representing said metadata in the second video further includes indicating in the second video, any one or more of:
    a location of the threat within the representation of the scene;
    motion of the threat; and
    showing some or all of the metadata in textual or pictorial form.

3. The method of claim 2, wherein indicating the location of the threat within the representation of the scene includes one or both of:
    drawing a shape around a non-photorealistic representation of the threat within the scene,
    placing an indicia, icon, picture or other marker at a location of the threat in the representation of the scene.

4. The method of claim 2, wherein the motion of the threat is represented by any one or more of the following:
    showing an updated location of the threat in successive video frames;
    indicating either or both of a track along which the threat has passed;
    a vector indicating the current motion of the threat; and
    an animation.

5. The method of claim 1, wherein the threat is represented in the second video by an avatar.

6. The method of claim 1, wherein generating the non-photorealistic representation of the scene further includes: processing the received video to adulterate or obscure the realism of the video by performing one or a combination of the following image processing steps: blurring, pixelating, modifying one or more attributes of each of the one or more video frames including resolution, gradient, brightness, contrast, saturation, sharpness, hue or similar thereof, masking, image distortion, merging frames, temporal or spatial averaging, compressing, or replacing at least a portion or an entire video frame with another predetermined or a randomly generated image.

7. The method of claim 1, wherein analysing at least the video of the scene being monitored to determine the presence of a threat within the scene includes performing video motion detection on the video to detect an intruder.

8. The method of claim 1, wherein analysing at least the video of the scene being monitored to determine the presence of a threat within the scene or determining metadata associated with the threat includes analysing data from at least a second source such as a second camera, a PIR detector, microwave detector, ultrasonic detector, perimeter intrusion detector, or pressure pad.

9. The method of claim 1, further including one or more of:
    capturing the video;
    transmitting the second video for playback;
    storing either or both of the video and the second video;
    playing the second video on a display;
    augmenting video of the scene to show metadata relating to the threat; and
    receiving an input authorising transmission of the video of the scene, and transmitting the video of the scene.

10. A method of representing a threat on a display of a video surveillance system of the type which captures a video of a scene being monitored by a camera, the method including:
    generating a second video, including one or more video frames, which non-photorealistically represents the scene, and in in the event that a threat is detected within the scene, representing metadata relating to the threat in the second video, wherein said second video includes a non-photorealistic representation of the threat.

11. The method of claim 10 further including selectively representing metadata depending on a permission level associated with a viewer of the display.

12. The method of claim 10 further including receiving data representing the permission level of the viewer and representing a predetermined subset of the metadata in accordance with the permission level.

13. The method of claim 10, wherein representing said metadata in the second video can include indicating in the second video, any one or more of:
    a location of the threat within the representation of the scene;
    motion of the threat;
    showing some or all of the metadata in textual or pictorial form.

14. The method of claim 13, wherein showing the location of the threat within the representation of the scene can include, drawing a shape around the non-photorealistic representation of the threat within the scene, placing an indicia, icon, picture or other marker at a location of the threat in the representation of the scene.

15. The method of claim 13, wherein the motion of the threat is represented by any one or more of:
    showing an updated location of the threat in successive video frames;
    by indicating either or both of a track along which the threat has passed; and
    a vector indicating the current motion of the threat.

16. The method of claim 10, wherein generating the second video, including one or more video frames, which non-photorealistically represent the scene from the received video, includes processing the received video to adulterate or obscure the realism of the video, by performing one or a combination of the following image processing steps: blurring, pixelating, modifying one or more attributes of each of the one or more video frames including resolution, gradient, brightness, contrast, saturation, sharpness, hue, masking, image distortion, merging frames, temporal or spatial averaging, compressing, replacing at least a portion or an entire video frame with another predetermined or a randomly generated image.

17. The method of claim 10 wherein at least some characteristics of the scene is preserved in the non-photo-realistic images.

18. A system including a computer processing system configured to perform a method as claimed in claim 1.

19. A system including a computer processing system configured to perform a method as claimed in claim 10.

* * * * *